United States Patent Office 3,206,866
Patented Sept. 21, 1965

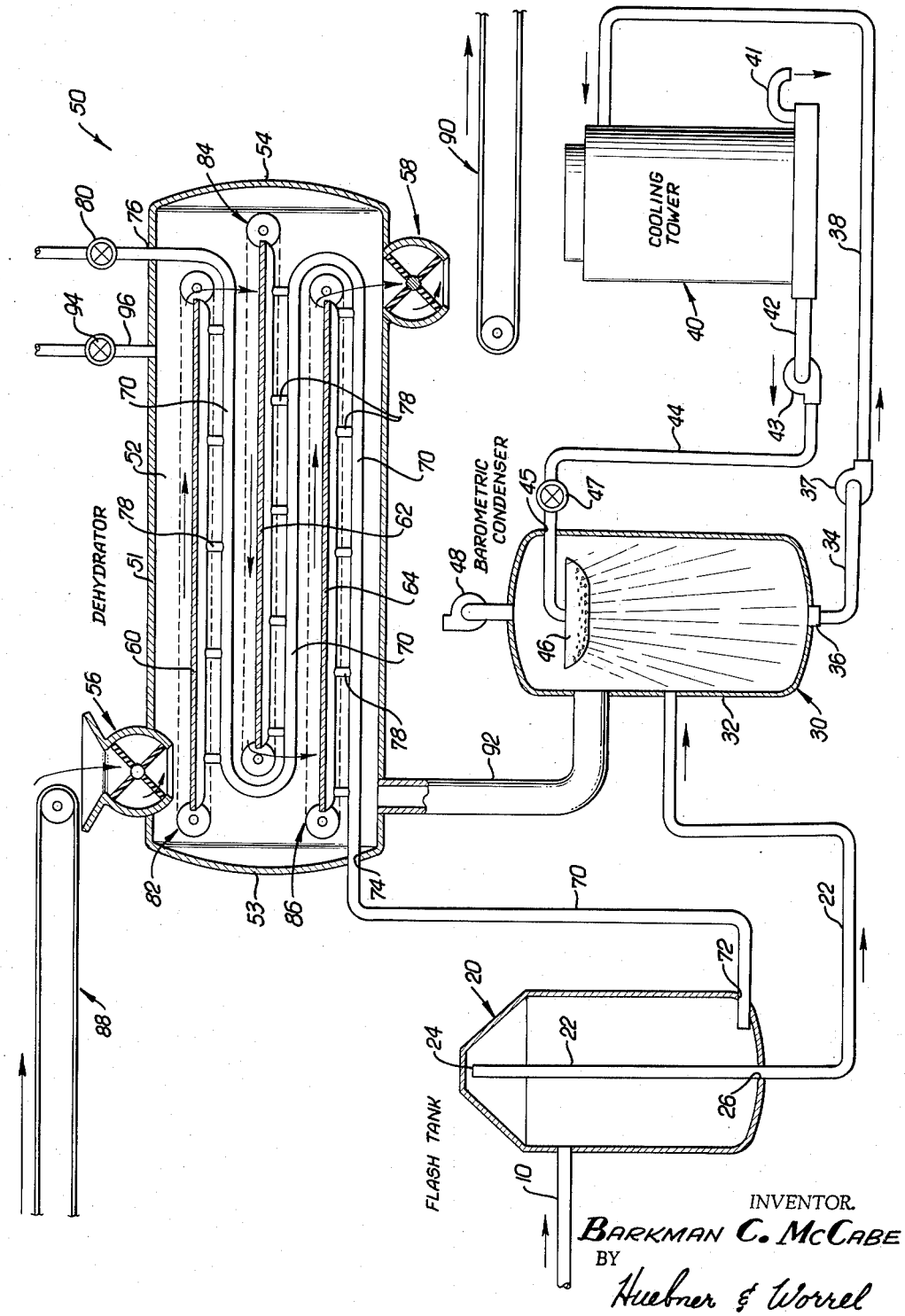

3,206,866
METHOD AND APPARATUS FOR DEHYDRATING
FOODS EMPLOYING GEOTHERMAL STEAM
Barkman C. McCabe, Los Angeles, Calif., assignor to
Magma Power Co., Los Angeles, Calif., a corporation
of California
Filed Feb. 7, 1963, Ser. No. 256,853
10 Claims. (Cl. 34—15)

This invention relates to a method and apparatus for the dessication of articles, especially food products, and more particularly to a method and apparatus for the utilization of geothermal steam for the dehydration of vegetables, fruits and meats.

The dehydration of foods is a rapidly expanding business, the increase being stimulated by constant improvements in the quality of the end products. Presently, by most known processes, approximately 90% of the original weight of the procesed product is removed by dehydration. Such processed foods are easy to compact and easy to ship, and furthermore, spoilage is drastically reduced or eliminated. Such foods may be stored for long periods, permitting food processing at times convenient to the processor rather than seasonal processing at crop times only. By present processes, food products are dried either by using fuel-heated forced air in a tunnel or a trough-like dehydrator, or they are dried in the presence of a vacuum produced generally by the use of vacuum pumps powered by electricity. The vacuum system of drying is preferable, in that the temperature is reduced, thus preventing caramelization of the sugar content, and permitting processing with improved color, flavor and cellular condition. However, the vacuum equipment normally used is expensive, as is the cost of energy required to maintain the desired vacuum.

The method and apparatus of the present invention have the advantages of vacuum dehydration, and additionally provide a method and apparatus, the operating costs of which are minimal. Additionally, the method and apparatus of the present invention offer substantial simplicity, the required vacuum being attained by the use of a barometric condenser. Additionally, the method and apparatus of the present invention are readily adjustable, so that the time of drying can be easily regulated to adjust for processing products of varying sizes, moisture content, and general physical characteristics.

It is therefore an object of the present invention to provide a method and apparatus whereby food products may be dehydrated by a vacuum system which provides means and apparatus which are relatively inexpensive to construct, maintain and operate.

It is another object of the present invention to provide such a method and apparatus which will be readily adjustable for processing products of varying physical characteristics, sizes and moisture content.

With these and other objects in view, the invention consists of the construction, arrangement and combination of the various parts of the device and the novel method steps whereby the objects contemplated are attained, as hereinafter set forth, pointed out in the appended claims, and illustrated in the accompanying drawing.

In the drawing:

The single figure is a diagrammatic representation of the method and apparatus of the present invention.

A fluid conduit 10 leads from a steam and hot water source, such as a geothermal steam well (not illustrated), to a flash tank 20. It will, of course, be understood that whereas a geothermal source of steam and hot water is suggested, any other source of steam and hot water may be utilized.

A steam pipe 22 terminates at an open end 24 in flash tank 20 near the top of tank 20, and the steam pipe 22 passes through an opening 26 in the shell of flash tank 20 to a barometric condenser 30, hereinafter described in detail, so as to provide a passageway for steam in tank 20 to condenser 30.

This flash tank 20 separates the geothermal mixture of steam and hot water by application of the principle that high-temperature liquids when passed from a region of pressure sufficient for stability into a low-pressure region are not able to contain all the heat originally possessed as heat of fluid, and so will be spontaneously partially evaporated by the surplus. This violent readjustment to thermal equilibrium is called "flashing" and occurs within flash tank 20 when hot fluid enters under the specified conditions via fluid conduit 10. Hence, because of this "flash" phenomenon steam is separated from the hot water taken from a geothermal source. This separated steam, in turn, when passed to the condenser 30 and cooled, makes it possible for the condenser 30 to suck vapors from the dehydrator 50 in accordance with this invention. A sample brief explanation of the thermal flashing which provides a means by which geothermal fluid can be used in this invention may be found in Van Nostrand's Scientific Encyclopedia (D. Van Nostrand Company, Inc. 1958) at page 664.

Barometric condenser 30 has a body 32. A pipe 34 is connected to a port 36 in body 32 and leads to a pump 37, and a pipe 38 leads from pump 37 to a cooling tower 40, or other source of cool water, pump 37 acting to pump water from condenser 30 through pipes 34 and 38 to said source of cool water. If a cooling tower 40 is used as the source of cool water, an overflow pipe 41 is provided.

A pipe 42 leads from cooling tower 40 to a pump 43, and a pipe 44 leads from pump 43, through an opening 45 in body 32 of condenser 30, to a spray head 46 disposed in condenser 30. Pump 43 thus acts to pump cool water from cooling tower 40 to spray head 46, from which said cool water is dispersed in a spray within condenser 30. If desired, a control valve 47 may be mounted on pipe 44 to control the flow of water from cooling tower 40 to condenser 30.

A pump 48 may be mounted on condenser 30, the function of said pump 48 being to pump off non-condensable gases from condenser 30. A steam ejector may be employed instead of the pump 48, or a combination of a pump and a steam ejector may be used.

A dehydrator, generally designated 50, includes a housing 51 defining a dehydrator chamber 52. The housing 51 is preferably of elongate, cylindrical configuration having closed ends 53 and 54. At the top of dehydrator housing 51, near one end 53 thereof, is a food input gate 56 which is preferably of a generally sealed "revolving door" type that will allow only a minimum of atmospheric air to enter the dehydrator chamber 52 so as to aid in the retention of the vacuum condition built up in dehydrator chamber in the manner hereinafter described. At the bottom of dehydrator housing 51, near the other end 54, is a food output gate 58 which also is preferably of a generally sealed "revolving door" type to minimize air leakage into the dehydrator chamber 52.

Inside the dehydrator chamber 52 are a plurality of vertically stacked food heating trays, three of these trays 60, 62 and 64 being shown in the drawing. These trays 60, 62 and 64 are either hollow or are each provided with a network of heating conduits, for circulation of hot water therethrough so as to heat the trays 60, 62 and 64.

A pipe 70 extends through the wall of flash tank 20 at an opening 72 near the bottom of the flash tank, and provides an outlet for hot water from the flash tank. This water will have a substantial pressure head due to steam pressure in the flash tank.

The hot water pipe 70 passes through an opening 74 in the dehydrator housing 51 and extends through the dehydrator chamber 52 adjacent to the food heating trays 60, 62 and 64, and thence out of the dehydrator chamber 52 through a suitable opening 76 in the housing 51 of the dehydrator 50. Suitable branch pipes 78 connect the pipe 70 with the insides of the hollow trays 60, 62 and 64, or with the tray heating conduits if such are employed. Thus, a direct hot water heating system is provided for the trays 60, 62 and 64 so that the trays 60, 62 and 64 are heating units for heating the food as it passes over the trays 60, 62 and 64. Pressure in this water heating system is controllable by a back pressure control valve 80 in the pipe 70 after pipe 70 leaves dehydrator chamber 52.

Sweeper type conveyor units 82, 84 and 86 are mounted in connection with the respective trays 60, 62 and 64 so as to continuously sweep the food along the respective trays. This "sweeper type conveyor" functions in a similar manner to the scraper portion of the V-bucket conveyor shown in Engineers' Illustrated Thesaurus by Herbert Herkimer (Chemical Publishing Co., Inc., 1952) at example C on page 298. Food passing downwardly through the food input gate 56 will be deposited on the heating tray 60 near its left end, and will be swept to the right along tray 60 by conveyor unit 82 and will drop off of the right-hand end of tray 60 onto the tray 62, which is offset somwhat to the right of tray 60.

The food thus deposited on tray 62 will be swept to the left along tray 62 by conveyor unit 84 and will drop off of the left-hand end of tray 62 onto tray 64, which is offset somewhat to the left of tray 62.

Then the food will be swept to the right along tray 64 by conveyor unit 86 and will drop off of the right-hand end of tray 64 into food output gate 58.

It will be apparent from the foregoing description of the dehydrator 50 that it is adapted for the continuous processing of food.

The food may be introduced into the food input gate 56 by means of an input conveyor unit 88, and the dehydrated food passing through the food output gate 58 may be collected on an output conveyor unit 90. Conveyor units 88 and 90 may employ conveyor belts of the rake type.

It is to be noted that the heating system shown in the drawing and described above is merely one system which the applicant has found suitable for the purpose, and that other systems may be used. The system which has been shown and described has several important advantages. One advantage is that it is highly economical, utilizing the hot water which is normally present with geothermal steam and therefore not requiring additional power. Another advantage is that this system provides for direct heating of the trays 60, 62 and 64 by passage of the hot water proximate the trays, and also provides for direct contact heating of the food on the trays. Such direct heating is very important because of the vacuum condition that is established in the dehydrator chamber 52, since heat conduction and convection are minimized by this condition.

The vacuum condition within dehydrator chamber 52 is controllable by adjustment of a suitable valve 94 in a pipe 96 which communicates with dehydrator chamber 52 through an opening in the dehydrator housing 51.

An air and vapor conduit 92 leads from an opening in the dehydrator housing 51 to an opening in condenser 30, and is disposed so that, by action of condenser 30, air and vapor will be drawn from dehydrator chamber 50, through conduit 80, to form a vacuum condition in dehydrator chamber 52.

In operation, steam and hot water from the geothermal steam well pass through conduit 10 and enter flash tank 20. Hot water under pressure from flash tank is conducted through pipe 72 so as to heat the trays 60, 62 and 64 in dehydrator chamber 52.

Meanwhile, conveyor units 88, 82, 84, 86 and 90 are activated so that food passes through dehydrator 50 for a predetermined period of time (during which time said food is heated by contact with the heated trays 60, 62 and 64).

At the same time, steam is gathered in flash tank 20 and passes through pipe 22 into barometric condenser 30, where the steam is condensed by the spray of cool water from spray head 46, this condensation of the steam creating a suction or vacuum condition in conduit 92.

Because of the free entry of air into dehydrator 50 is effectively blocked by the "revolving door" type gates 56 and 58, the action of barometric condenser 30 will create and maintain an effective vacuum condition in dehydrator 50, and food passing through dehydrator 50, acted upon by heat and vacuum, will be desiccated, moisture therein being discharged therefrom by boiling action and drawn into condenser 30, from which it is in turn discharged by the action of pump 37 and returned to the source of cool water, which may be cooling tower 40, while non-condensable material present in condenser 30 will also be pumped off by the action of pump 48.

By way of example, rather than by way of limitation, it will be seen that through the condensation of steam in condenser 30 a vacuum down to two inches or mercury, or about one-fifteenth of normal atmospheric pressure, will be produced in dehydrator 50. At this degree of vacuum, water will vaporize at any temperature in excess of 101° F. The heat introduced into the food by contact of the food with heated trays 60, 62 and 64 will maintain the food at a temperature in excess of the point of vaporization of the vacuum. Control of the time of travel of the food through dehydrator 50 will control the degree of desiccation of the food.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures and devices.

What is claimed is:

1. A vacuum-type dehydration device which comprises:
   (a) a source of steam and hot water;
   (b) a flash tank connected to said source of steam and hot water for separating said steam from said hot water;
   (c) a barometric condenser;
   (d) passage means between said flash tank and said condenser for conveying steam from said flash tank to said condenser;
   (e) means for cooling said condenser;
   (f) a housing defining a substantially air-tight dehydrator chamber;
   (g) a heating unit in said dehydrator chamber;
   (h) means for conveying hot water from said flash tank to said heating unit; and
   (i) a conduit between said dehydrator chamber and said condenser for conducting air and vapors from said dehydrator chamber to said condenser so as to maintain a vacuum condition in said dehydrator chamber.

2. A device as defined in claim 1, including conveying means for continuously conveying products to be processed into, through and out of said dehydrator chamber while maintaining vacuum in said dehydrator chamber.

3. A device as defined in claim 2, wherein said conveying means includes revolving door type input and output gates in said housing for conducting said products into and out of said dehydrator chamber, respectively.

4. A vacuum-type device for dehydrating products which comprises:
   (a) a source of steam and hot water;
   (b) a flash tank connected to said source of steam and hot water for separating said steam and said hot water;
   (c) a barometric condenser;
   (d) passage means between said flash tank and said condenser for conveying steam from said flash tank to said condenser;

(e) means for cooling said condenser;

(f) a housing defining a substantially air-tight dehydrator chamber;

(g) a heating units in said dehydrator chamber;

(h) means for conveying hot water from said flash tank to said heating unit;

(i) a conduit between said dehydrator chamber and said condenser for drawing air from said dehydrator chamber to said condenser to maintain a vacuum condition in said dehydrator chamber, and for drawing moisture discharged from products being dehydrated in said dehydrator chamber from said chamber to said condenser; and (j) conveying means for continuously conveying said products into, through and out of said dehydrator chamber while maintaining a vacuum condition in said chamber, said conveying means conveying said products in heat-transferring relationship with said heating unit so that said products will be heated as they pass through said dehydrator chamber.

5. A device as defined in claim 4, wherein said heating unit comprises tray means heated by said hot water, and conveying means includes conveyor structure associated with said tray means for sliding said products along said tray means so that heat will be transferred from said tray means to said products.

6. A device as defined in claim 5, wherein said tray means includes a plurality of generally horizontally disposed, vertically spaced trays, and said conveying means includes a substantially air-tight input gate in said housing positioned above the uppermost of said trays, and a substantially air-tight output gate in said housing positioned below the lowermost of said trays.

7. A device as defined in claim 6, wherein said input and output gates are of the revolving door type.

8. The method of desiccation of food products including the steps of:

(a) introducing food products to be processed into a substantially air-tight dehydrator chamber;

(b) heating said food products in said dehydrator chamber by transferring heat thereto from a source of hot water;

(c) introducing steam into a barometric condenser and simultaneously cooling said condenser so as to condense said steam; and (d) drawing air and water vapor into said condenser from said dehydrator chamber by means of said steam condensation so as to create a sufficient vacuum condition in said dehydrator chamber to cause water contained in said food products to boil off of said food products.

9. The method of desiccation of food products comprising the steps of:

(a) introducing food products to be processed into a substantially air-tight dehydrator chamber;

(b) heating said food products in said dehydrator chamber to at least approximately 101° F., by transferring heat thereto from a source of hot water;

(c) introducing steam into a barometric condenser and simultaneously cooling said condenser so as to condense said steam; and (d) drawing air and discharged moisture from said food products from said dehydrator chamber into said condenser by the action of said steam condensation so as to maintain a vacuum condition of approximately two inches or less of mercury in said dehydrator chamber, whereby water contained in said food products will be caused to boil off of said food products.

10. The method of desiccation of food products including the steps of:

(a) introducing food products to be processed into a substantially air-tight dehydrator chamber;

(b) separating steam and hot water from a geothermal source thereof by passing the geothermal source of steam and hot water through a flash tank;

(c) heating said food products in said dehydrator chamber by transferring heat from said hot water introduced into said dehydrator to said food products;

(d) introducing said steam into a barometric condenser and simultaneously cooling said condenser so as to condense said steam; and (e) drawing air and water vapor into said condenser from said dehydrator chamber by means of said steam condensation so as to create a sufficient vacuum condition in said dehydrator chamber to cause water contained in said food products to boil off of said food products.

References Cited by the Examiner
UNITED STATES PATENTS

| | | | |
|---|---|---|---|
| 888,257 | 5/08 | Passburg | 34—203 |
| 2,123,080 | 7/38 | Rowland | 34—15 X |
| 2,507,632 | 5/50 | Hickman | 34—75 X |
| 2,528,476 | 10/50 | Roos et al. | 34—75 X |
| 2,621,492 | 12/52 | Bearsley et al. | 34—15 X |

OTHER REFERENCES

Publication: "Building Heating With Refrigeration Equipment," from Power, June 16, 1931, vol. 73, No. 24, pages 948, 949.

ROBERT A. O'LEARY, *Primary Examiner.*

NORMAN YUDKOFF, *Examiner.*